United States Patent [19]

Taylor

[11] Patent Number: 4,611,794
[45] Date of Patent: Sep. 16, 1986

[54] TENSION-COMPRESSION LIQUID SPRING UNIT

[75] Inventor: Paul H. Taylor, Grand Island, N.Y.

[73] Assignee: Tayco Developments, Inc., North Tonawanda, N.Y.

[21] Appl. No.: 250,845

[22] Filed: Apr. 3, 1981

[51] Int. Cl.⁴ .............................................. F16F 5/00
[52] U.S. Cl. ................................... 267/64.13; 92/53; 188/321.11; 188/322.17; 188/322.19; 188/322.22; 267/126; 267/136
[58] Field of Search ................... 188/321.11, 322.11, 188/322.16, 322.17, 322.19, 322.22; 267/64.11, 64.13, 124, 126, 136, 138; 92/52, 53, 65; 213/43, 44, 45

[56] References Cited

U.S. PATENT DOCUMENTS

| 2,842,356 | 7/1958 | Taylor | 267/124 |
| 2,909,292 | 10/1959 | Henrikson | 213/43 |
| 3,028,019 | 4/1962 | Settles et al. | 213/43 X |
| 3,047,162 | 7/1962 | Blake | 213/43 X |
| 3,098,644 | 7/1963 | Phillips | 267/64.11 X |
| 3,163,299 | 12/1964 | Settles | 213/43 X |
| 3,412,869 | 11/1968 | Wallace et al. | 213/43 X |
| 3,933,344 | 1/1976 | Taylor | 267/64.13 |

FOREIGN PATENT DOCUMENTS 240902  6/1965  Austria ................................. 213/43

Primary Examiner—George E. A. Halvosa
Attorney, Agent, or Firm—Joseph P. Gastel

[57] ABSTRACT

A liquid spring unit operable in both tension and compression includes a liquid spring having a cylinder, a piston, a seal between the cylinder and piston, and compressible liquid in the cylinder. A cylinder extension has diametrically opposed slots therein. A sleeve slidably mounts the cylinder and has diametrically opposed slots in alignment with the slots in the cylinder extension. A link is attached to the piston and has pintles received in the pairs of aligned slots. A first load-receiving member is attached to the sleeve and a second load-receiving member bears on the link to force the piston into the cylinder when the load-receiving members are moved toward each other and causes the cylinder to be moved onto the piston when the load-receiving members are pulled away from each other.

11 Claims, 13 Drawing Figures

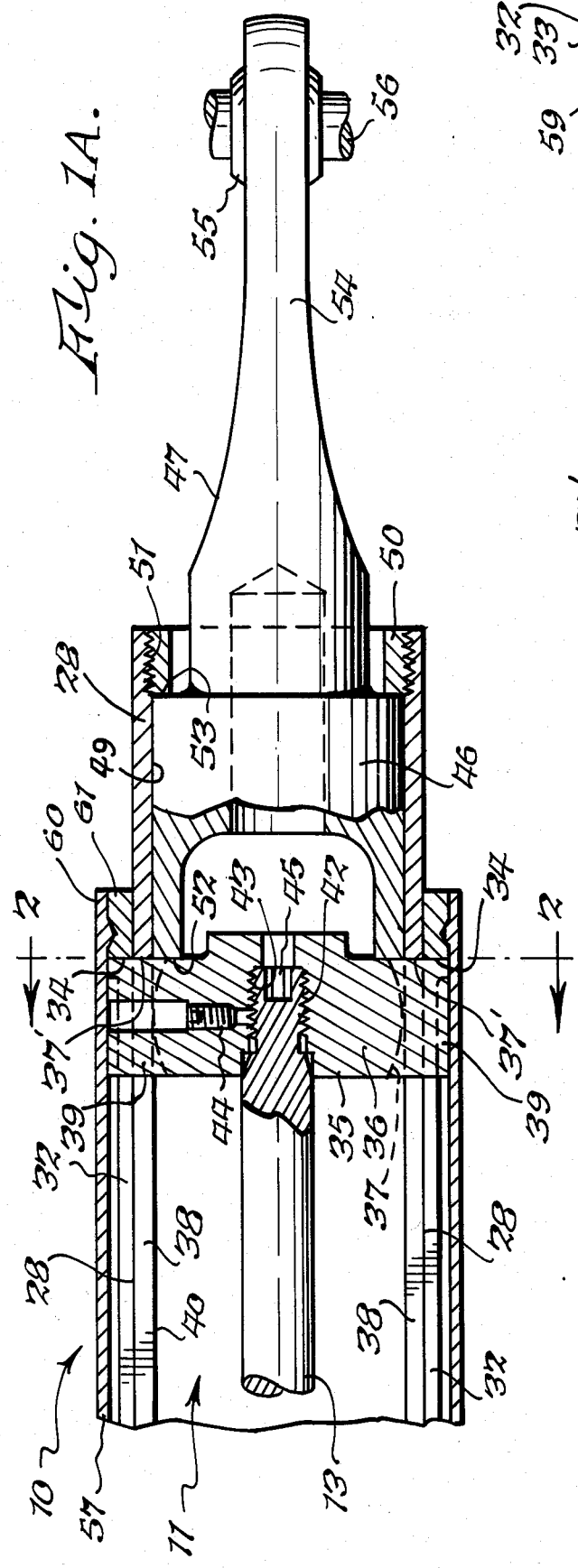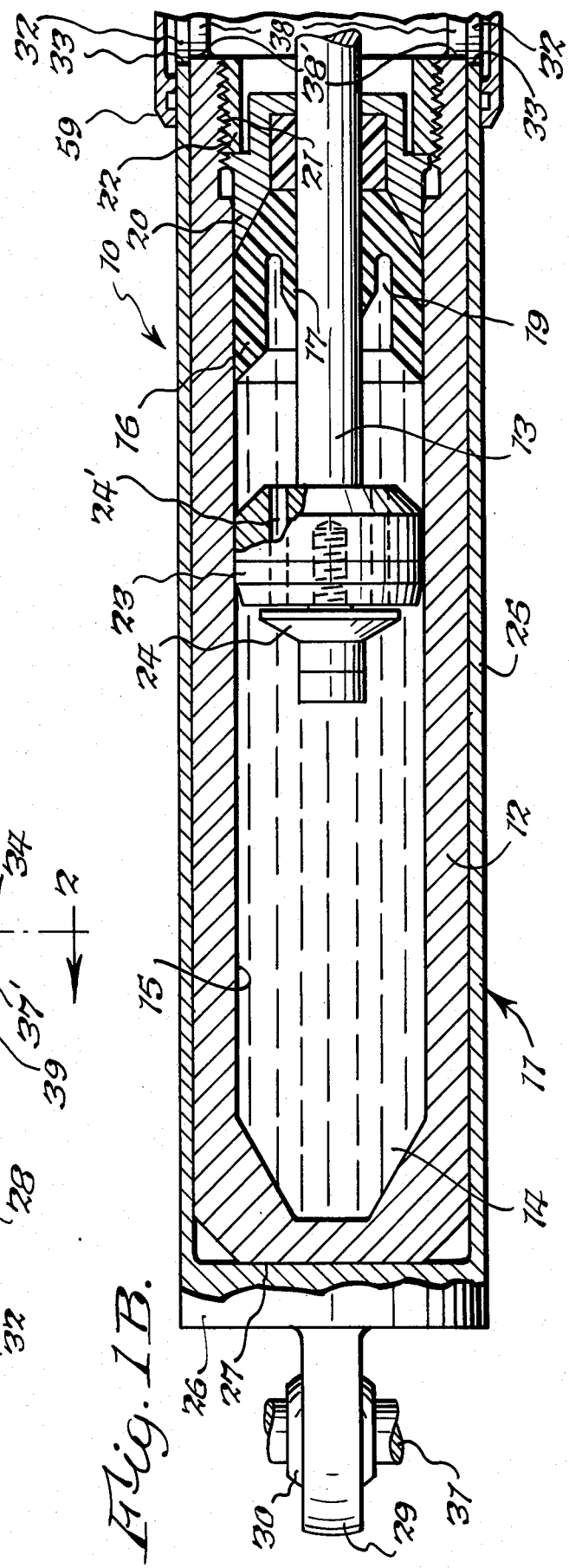

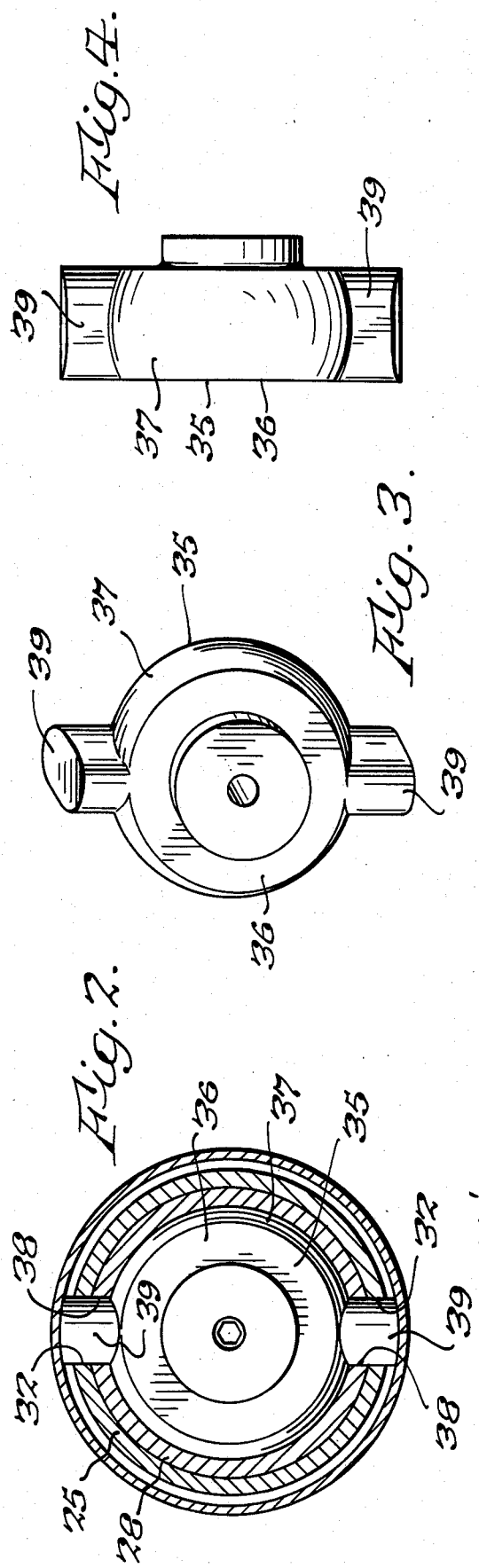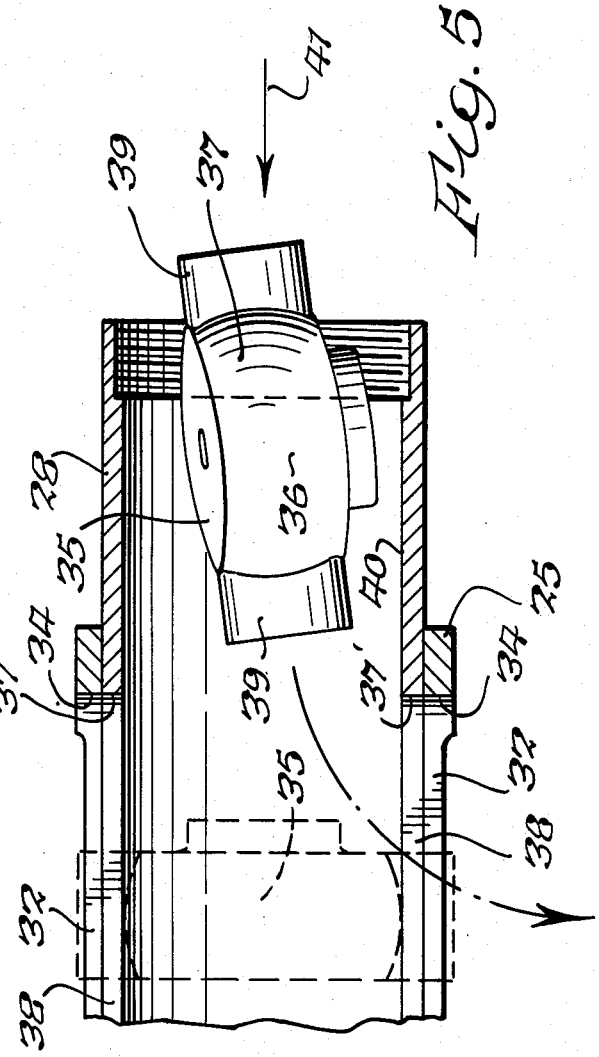

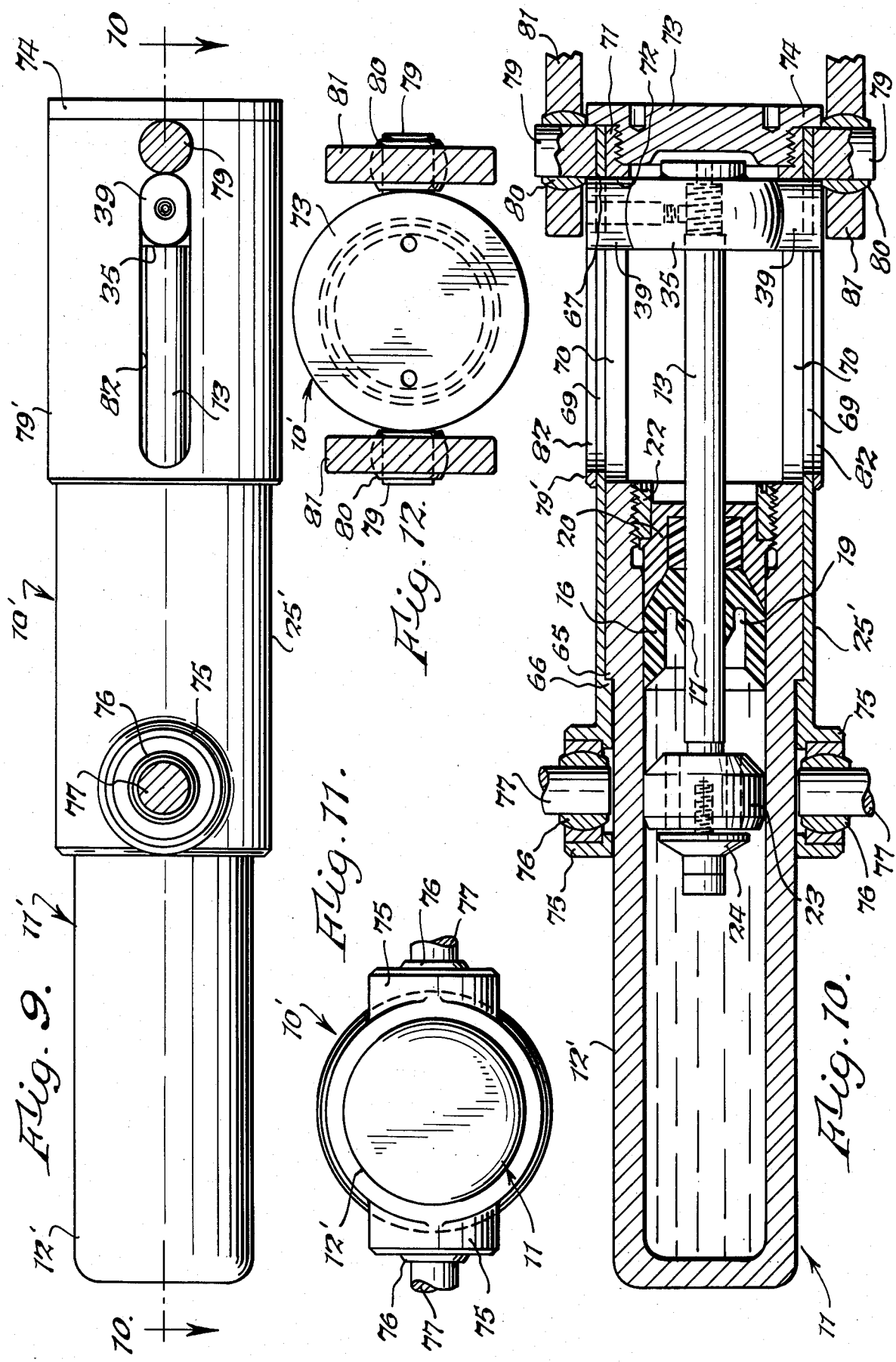

TENSION-COMPRESSION LIQUID SPRING UNIT

BACKGROUND OF THE INVENTION

The present invention relates to a liquid spring unit operable in both tension and compression.

In the past liquid spring units operable in tension and compression were known. A liquid spring of this general type is shown in U.S. Pat. No. 2,842,356. These units were generally deficient in that they utilized a plurality of liquid seals which were subject to leakage and which caused the unit to be relatively complex and expensive.

SUMMARY OF THE INVENTION

It is accordingly one object of the present invention to provide an improved liquid spring unit operable in both tension and compression and which contains only a single seal between the piston and cylinder thereof.

Another object of the present invention is to provide an improved liquid spring unit operable in both tension and compression which utilizes only a single liquid spring and which relies on an unique mechanical arrangement associated with the liquid spring to cause the liquid spring to absorb both tension and compression forces.

Yet another object of the present invention is to provide an improved liquid spring unit operable in both tension and compression which is relatively simple in construction. Other objects and attendant advantages of the present invention will readily be perceived hereafter.

The present invention relates to a liquid spring unit operable in both tension and compression comprising: a liquid spring including a cylinder, piston, compressible liquid in said cylinder and a single liquid seal between said piston and cylinder; first and second spaced attachment means on said unit for attachment to structural members; first means for holding said cylinder against movement in a first direction when said first and second spaced attachment means are moved toward each other to cause said piston to move in said first direction into said cylinder to thereby provide a spring action in compression; and second means for holding said piston against movement in a second direction which is opposite to said first direction when said first and second spaced attachment means are moved away from each other to cause said cylinder to be moved in said second direction to thereby provide a spring action in tension. The various aspects of the present invention will be more fully understood when the following portions of the specification are read in conjunction with the accompanying drawings wherein:

BRIEF DESCRIPTION OF THE DRAWINGS

FIG. 1A is a fragmentary cross sectional view of one end of the tension-compression liquid spring unit of the present invention;

FIG. 1B is a fragmentary cross sectional view of the opposite end of the tension-compression liquid spring unit;

FIG. 2 is a cross sectional view taken substantially along line 2—2 of FIG. 1A and showing the relationship between the various parts;

FIG. 3 is a perspective view of the spherical load member or link;

FIG. 4 is a side elevational view of the link of FIG. 3;

FIG. 5 is a fragmentary cross sectional view showing the manner in which the spherical load member or link is installed in position in the remainder of the unit;

FIG. 9 is a plan view, partially in cross section, showing a modified form of the liquid spring unit;

FIG. 10 is a fragmentary cross sectional view taken substantially along line 10—10 of FIG. 9;

FIG. 11 is an end elevational view of the unit taken from the left end of FIG. 9; and FIG. 12 is an end elevational view of the unit taken from the right end of FIG. 10.

DESCRIPTION OF THE PREFERRED EMBODIMENTS

Figure 6:
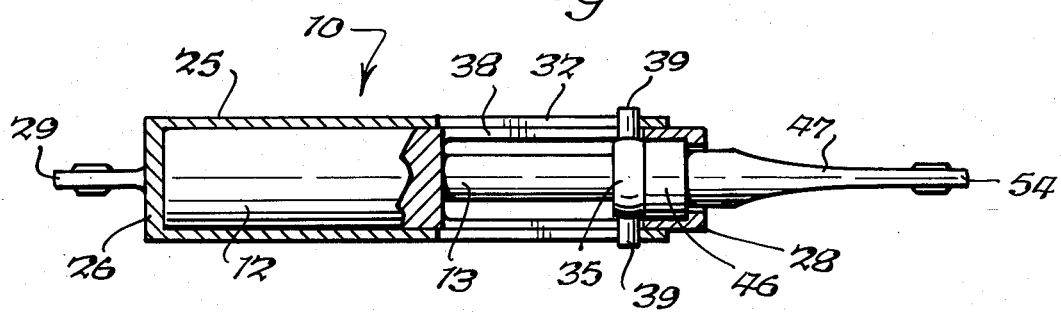
FIG. 6 is a schematic fragmentary cross sectional view of the unit in a neutral position when it is not subjected to either tension or compression.

The liquid spring unit 10 is operable in both tension and compression and utilizes a single liquid spring 11 consisting essentially of a cylinder 12 having a piston 13 and containing a compressible liquid 14, such as a silicone liquid, in chamber 15. The unit 10 is operable to provide a hydraulic spring action in both tension and compression by virtue of the manner in which the liquid spring 11 is mechanically mounted on the remainder of the unit, thereby permitting the use of a single seal 16 which seals the compressible liquid 14 from leakage between seal 16 and cylinder 12 and between seal 16 and piston 13. In this respect, seal 16 includes an annular lip 17 which receives piston 13, and an annular chamber 19 surrounds lip 17 so that the pressurized liquid in chamber 19 will enhance the sealing relationship. The foregoing sealing arrangement is well known in the art and does not form a novel part of the present subject matter.

An annular metallic cap 20 screws into tapped portion 21 of the cylinder to move seal 16 to its desired position and while doing so effects compression of the compressible liquid 14 to approximately 3% or roughly about 6,000 psi internal pressure. A threaded collar 22 is also received in tapped portion 21 to hold cap 20 in position. Piston 13 mounts a shock absorber head 23 which modulates flow of liquid on opposite sides thereof to accomplish dampening. A fast return valve 24 is mounted for slidable axial movement relative to shock absorber head 23 to close off ports 24' when piston 13 moves to the left and which returns to the open position shown in FIG. 1B to permit a fast return of piston 13 to the position in which it will move as the liquid 14 expands. This type of action is especially desirable when the unit 10 is used in conjunction with an arresting hook construction for navy carrier aircraft. The foregoing described construction of the hydraulic spring 11 is known and by itself does not constitute the novel portion of the present device.

As noted briefly above, the hydraulic spring 11 is utilized in conjunction with a mechanical construction, thereby permitting the use of the single seal 16. The unit 10 includes a housing or sleeve 25 in which cylinder 12 is slidably mounted. An end wall 26 on sleeve 25 is abutted by the end wall 27 of cylinder 12 under certain conditions, as will be described hereafter. An attachment member 29 is rigidly attached to end wall 26 and pivotally mounts a spherical ball 30 which is attached to an external member 31. Housing 25 also includes a pair of diametrically opposed slots 32 (FIGS. 1A, 1B, 2 and 5). Slots 32 terminate at 33 in FIG. 1B and at 34 in FIG. 1A. A cylinder extension 28 is formed integrally with cylinder 12. Diametrically opposed slots 38 are formed in cylinder extension 28 Slots 38 terminate at 37' in FIG. 1A and at 38' in FIG. 1B.

A spherical loading member or link 35 includes a central portion 36 having a spherical outer surface 37 from which a pair of diametrically opposed pintles 39 extend. Pintles 39 ride in slots 32 and 38. The outer diameter of spherical surface 37 is slightly less than the internal diameter at 40 of cylinder extension 28. Link 35 is installed into the position shown in FIG. 1A by inserting it in the direction of arrow 41 (FIG. 5) into cylinder extension 28, as shown, and thereafter rotating link 35 to cause pintles 39 to be received in slots 38 and 32. Link 35 is shown in its rotated position in dotted lines in FIG. 5. During the installation, piston 13 is moved to the left in FIG. 1B as much as it is necessary to permit link 35 to be installed. Thereafter, piston 13 is released so that the threaded end portion 42 of piston 13 is aligned with tapped portion 43 of link 35. Thereafter, piston 13 is rotated so that a threaded connection is established between threaded end portion 42 and tapped portion 43. A set screw 44 is thereafter installed in link 35, as shown in FIG. 1A, to hold the link 35 and piston 13 in locked relationship. Piston 13 is rotated to effect the foregoing union by inserting an Allen wrench into socket 45. In the neutral position of unit 10, pintles 39 abut ends 34 and 37' of slots 32 and 38, respectively.

After the piston 13 and link 35 have been assembled, liquid spring 11 is preloaded because of the geometry of the various parts which causes piston 13 to extend into cylinder 12 a predetermined amount so that there is a quantity of liquid between piston head 23 and seal 16 to achieve desired flow characteristics. The end portion 46 of attachment member 47 is then slid into chamber 49 of cylinder extension 28. A threaded securing collar 50 is threaded into tapped portion 51 at the end of extension 28 to hold portion 46 in position with one end 52 abutting the face of link 35 and the opposite end 53 abutting annular ring 50. Attachment member 47 includes a shank portion 54 pivotally mounting a spherical ball member 55 which attaches to an external member 56.

A protective sleeve 57 has one end 59 located on sleeve 25 in the position shown in FIG. 1B and the other end 60 mounted on ring 61 which is slidably mounted on cylinder extension 28. Sleeve 57 protects the inside of unit 10 against the entry of foreign matter through slots 38 and 32.

Figure 7:
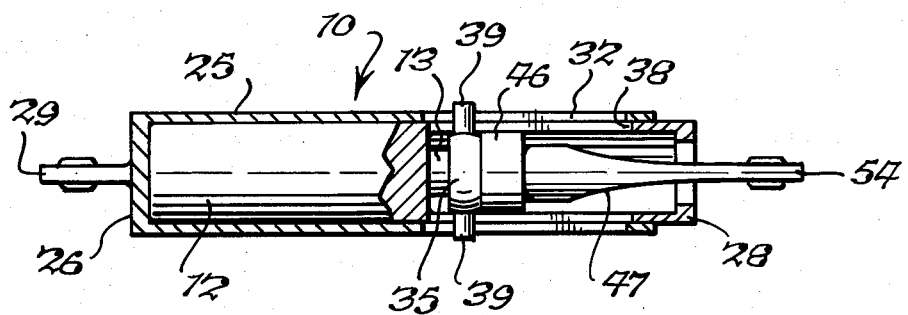
FIG. 7 is a view similar to FIG. 6 but showing the position the parts assume when the unit is placed in compression.
Figure 8:
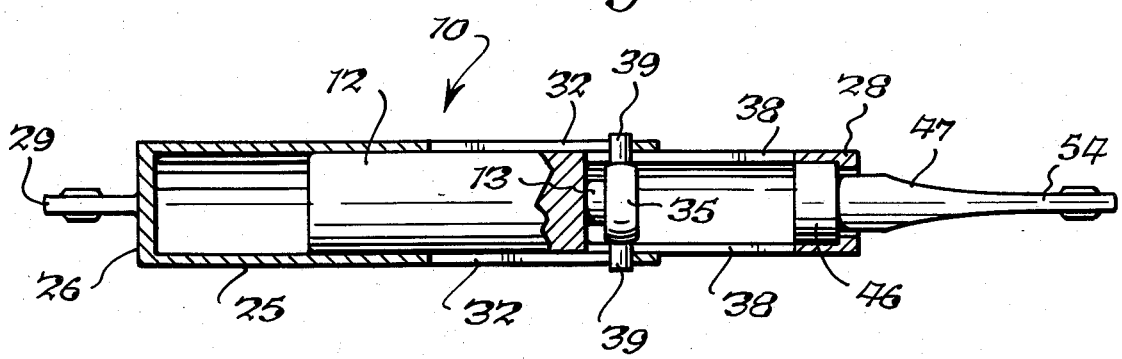
FIG. 8 is a view similar to FIG. 6 but showing the positions which the parts assume when the unit is placed in tension.

The operation of unit 10 can best be explained by reference to FIGS. 6-8. In FIG. 6 unit 10 is shown in a neutral position, that is, it is neither placed in tension or compression, and accordingly the various parts are in the same position as shown in FIGS. 1A and 1B. When structural members 31 and 56 (FIGS. 1A and 1B) are caused to approach each other, unit 10 is placed in compression. In this event, end portion 46 of attachment member 47 bears against link or load-receiving member 35 which in turn bears against the end of piston 13 driving it into cylinder 12, and the latter is held against movement because it abuts end wall 26 of sleeve 25. During the compressive action, pintles 39 ride freely in slots 38 and 32. When structural members 56 and 31 are pulled apart, unit 10 is placed in tension. In this case, end portion 46 of attachment member 47 pulls on cylinder extension 28 and this causes cylinder 11 to move to the position of FIG. 8 from the position of FIG. 6. However, pintles 39 of load-bearing member or link 35 will ride in slots 38 but will abut ends 34 of slots 32, and thus link 35 will be held against movement while piston 13 bears against it and is driven into cylinder 12. Thus, essentially when unit 10 is placed in compression, the piston 13 is driven into cylinder 11, whereas when the unit is placed in tension, the cylinder 11 is caused to be driven onto piston 13. When the external forces applied to structural members 31 and 56 are removed, the inherent spring quality of liquid spring 11 will cause the unit to return to the neutral position of FIG. 6.

In FIGS. 9-12 a modified form of the present invention is disclosed. The cylinder 12' corresponds to cylinder 12 of FIG. 1B, and except for the shape of cylinder 12', liquid spring 11' is identical to liquid spring 11 of FIG. 1B. Also, load-bearing member or link 35 is identical to link 35 of FIG. 1A. The only difference between the embodiment of FIGS. 1A-1B and FIGS. 9-12 is in the configuration of cylinder 12' and the configuration of the sleeve or housing 25' which corresponds to sleeve 25 of FIG. 1B, and related structure. In this respect, cylinder 12' includes an annular shoulder 65 which is abutted by annular shoulder 66 on sleeve 25'. Pintles 39 of link 35 bear against shoulders 67 at the ends of slots 69 of sleeve 25'. Thus, shoulders 65 and 66 are held in mating engagement as a result of the action of liquid spring 11'. Slots 70 are provided in cylinder extension 71 for receiving pintles 39 which bear against shoulders 72 at the ends of slots 70. A plug 73 threads into cylinder extension 71 and provides an annular flange 74. Sleeve 25' includes annular portions 75 formed integrally therewith which receive spherical bearings 76 which in turn receive structural members 77. Pins 79 are received in spherical bearings 80 which support structural members 81. An outer sleeve 79' surrounds housing 25' and has slots 82 which receive pintles 39. The right ends of slots 82 bear against pintles 39 when the unit is placed in compression, and the pintles 39 ride in slots 82 and 69 when the unit is placed in tension.

When structural members 81 and 77 are caused to approach each other, unit 10' will be placed in compression and under these circumstances, shoulders 66 will hold cylinder 12' against movement to the left while pins 79 engage pintles 39 to move link 35 to the left and thus move piston 13 into cylinder 12'. When tension forces tend to move structural members 77 and 81 apart, pins 79 will engage flange 74 of cylinder extension 71 to move cylinder 12' to the right while shoulders 67 of sleeve 25 prevent pintles 39 from moving to the right and thus cylinder 12' will be driven onto piston 13. It can thus be seen that the only essential difference between the embodiment of FIGS. 1A-1B and FIGS. 9-12 is in the particular structure described above, namely, the shape of cylinder 12', the shape of sleeve 25', and the related structure for receiving external members 77 and 79.

It can thus be seen that the liquid spring construction of the present invention is manifestly capable of achieving the above enumerated objects, and while preferred embodiments of the present invention have been disclosed, it will be understood that the present invention is not limited thereto, but may be otherwise embodied within the scope of the following claims.

What is claimed is:

1. A liquid spring unit operable in both tension and compression comprising: a liquid spring including a cylinder, piston, compressible liquid in said cylinder, and liquid seal means between said piston and cylinder; a housing mounting said cylinder therein for slidable movement; first attachment means on said housing for attachment to a first structural member; second attachment means spaced from said first attachment means and mounted relative to said cylinder for attachment to a second structural member; first means supported by said housing for holding said cylinder against movement in a first direction when said first and second spaced attachment means are moved toward each other to cause said second attachment means to effectively engage said piston and cause said piston to move in said first direction into said cylinder to thereby provide a spring action in compression; and second means supported by said housing for holding said piston against movement in a second direction which is opposite to said first direction when said first and second spaced attachment means are moved away from each other to cause said cylinder to be moved in said second direction to thereby provide a spring action in tension.

2. A liquid spring unit operable in both tension and compression comprising: a liquid spring including a cylinder, a piston, compressible liquid in said cylinder, and liquid seal means between said piston and cylinder; a housing mounted about said cylinder and slidably mounting said cylinder therein for movement relative thereto; link means for movably coupling said piston to said housing and for permitting it to move in a first direction toward said cylinder but holding it against movement in a second direction opposite to said first direction away from said cylinder; first attachment means supported by said housing for attachment to a first external member; and second attachment means effectively mounted relative to said cylinder for attachment to a second external member for moving said cylinder in said second direction away from said first attachment means while said piston is held against movement by said link means to thereby provide a liquid spring action for tension forces; said second attachment means moving said piston in said first direction when said second attachment means moves toward said first attachment means while said housing holds said cylinder against movement in said first direction to thereby provide a liquid spring action for compression forces.

3. A liquid spring unit operable in both tension and compression as set forth in claim 2 wherein said housing comprises an elongated member having a first end portion for receiving said cylinder; and a second end portion spaced from said first end portion for engaging said link means.

4. A liquid spring unit operable in both tension and compression as set forth in claim 3 wherein said elongated member comprises a sleeve-like member.

5. A liquid spring unit operable in both tension and compression as set forth in claim 4 including a first portion on said link means for engagement with said piston; and a second portion on said link means for abutting engagement with said sleeve-like member.

6. A liquid spring unit operable in both tension and compression as set forth in claim 5 including an extension on said cylinder located on the opposite side thereof from said first attachment means for attachment to said second attachment means;, said link means being located between said cylinder and the remote end portion of said extension most remote from said cylinder.

7. A liquid spring unit operable in both tension and compression as set forth in claim 6 including slot means in said extension; and wherein said second portion on said link means comprise end portions in said slot means.

8. A liquid spring unit operable in both tension and compression as set forth in claim 7 including second slot means in said sleeve-like member for also receiving said end portions on said link means.

9. A liquid spring unit operable in both tension and compression as set forth in claim 8 wherein said second attachment means includes an abutment member for abutting said link means and said remote end portion of said extension when said liquid spring unit is exposed to neither tension nor compression; said abutment member abutting only said link means during compression and abutting only said remote end portion of said extension during tension.

10. A liquid spring unit operable in both tension and compression as set forth in claim 7 wherein said extension is of generally cylindrical cross sectional configuration; and wherein said first portion of said link means comprises a member having an outer configuration in the form of a portion of a sphere which is of slightly lesser diameter than the diameter of said extension; and wherein said end portions comprise pintles extending outwardly from said first portion.

11. A liquid spring unit operable in both tension and compression comprising a liquid spring having a cylinder, a piston having a first portion within said cylinder and a second portion external of said cylinder, a seal between said cylinder and piston, compressible liquid in said cylinder, a cylinder extension attached to said cylinder and having a plurality of first slots therein, a housing in the form of a sleeve for slidably mounting said cylinder and said cylinder extension and having a plurality of second slots therein in alignment with said plurality of first slots, a link in engagement with said second portion of said piston and having a plurality of pintles received in said plurality of aligned first and second slots, a first load-receiving member attached to said sleeve, first abutment means on said housing for engaging said cylinder, a second load-receiving member for bearing on said link to force the piston into said cylinder while said pintles travel in said first and second slots toward said cylinder when said load-receiving members are moved toward each other and while said abutment means prevents said cylinder from moving relative to said housing, second abutment means on said cylinder extension for selectively being engaged by said second load-receiving member, said second slots having ends remote from said cylinder for engaging said pintles and preventing movement of said link when said second load-receiving member engages said second abutment means and said first and second load-receiving members are pulled away from each other.

* * * * *